(12) United States Patent
Sanders et al.

(10) Patent No.: US 10,001,785 B2
(45) Date of Patent: *Jun. 19, 2018

(54) FLUID REGULATOR HAVING A BIASED PRESSURE SENSE TUBE

(71) Applicant: EMERSON PROCESS MANAGEMENT REGULATOR TECHNOLOGIES, INC., McKinney, TX (US)

(72) Inventors: Jeffrey Michael Sanders, Dallas, TX (US); Tung Kim Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/712,631

(22) Filed: May 14, 2015

(65) Prior Publication Data

US 2015/0355642 A1 Dec. 10, 2015

Related U.S. Application Data

(60) Provisional application No. 62/008,772, filed on Jun. 6, 2014.

(51) Int. Cl.
*F16K 17/34* (2006.01)
*G05D 7/01* (2006.01)
(Continued)

(52) U.S. Cl.
CPC ......... *G05D 7/012* (2013.01); *F16K 31/1262* (2013.01); *F16K 31/1266* (2013.01);
(Continued)

(58) Field of Classification Search
CPC . F16K 31/1262; F16K 31/1266; G05D 16/02; G05D 16/0694; G05D 7/012; Y10T 137/7754
(Continued)

(56) References Cited

U.S. PATENT DOCUMENTS

| 1,011,572 | A | * | 12/1911 | Burns | ................. | F16K 7/10 |
| | | | | | | 138/46 |
| 1,087,988 | A | * | 2/1914 | Sheldon | ................. | G01F 1/46 |
| | | | | | | 73/861.66 |

(Continued)

FOREIGN PATENT DOCUMENTS

WO WO-2011088228 A2 7/2011

OTHER PUBLICATIONS

International Search Report for Application No. PCT/US2015/034357 dated Jun. 17, 2016.
(Continued)

*Primary Examiner* — Umashankar Venkatesan
(74) *Attorney, Agent, or Firm* — Marshall, Gerstein & Borun LLP

(57) ABSTRACT

A fluid regulating device includes a valve body, a control element, a control assembly, and a sense tube. The valve body has an inlet, an outlet, a valve port, and a control element adapted to be displaced relative to the valve port to control the flow of a fluid between the inlet and the outlet. The control assembly is operatively coupled to the control element and includes a diaphragm disposed adjacent a diaphragm chamber. The sense tube has a first end, a second end, and a sense hole. The first end is positioned to communicate with the diaphragm chamber, the second end is disposed adjacent the outlet, and the sense hole being
(Continued)

formed in the sense tube between the first end and the second end and being oriented along an axis that is angled relative to an axis of the outlet.

20 Claims, 3 Drawing Sheets

(51) Int. Cl.
  *G05D 16/02* (2006.01)
  *G05D 16/06* (2006.01)
  *F16K 31/126* (2006.01)
(52) U.S. Cl.
  CPC ......... *G05D 16/02* (2013.01); *G05D 16/0694* (2013.01); *Y10T 137/7754* (2015.04)
(58) Field of Classification Search
  USPC .......... 137/488–505.47; 251/118; 138/45, 46
  See application file for complete search history.

(56) References Cited

U.S. PATENT DOCUMENTS

| | | | | |
|---|---|---|---|---|
| 1,262,225 A | * | 4/1918 | Meyer | ................. G05D 16/163 137/484.2 |
| 1,918,602 A | * | 7/1933 | Joyce | ................. G05D 16/0677 137/484.4 |
| 2,690,755 A | * | 10/1954 | Haner | .................... A24F 19/14 131/236 |
| 4,030,481 A | | 6/1977 | Hill | |
| 4,559,836 A | * | 12/1985 | Coleman | ................... G01F 1/46 73/861.66 |
| 8,281,803 B2 | | 10/2012 | Mevius et al. | |
| 8,336,574 B2 | | 12/2012 | Kranz et al. | |
| 2005/0173548 A1 | | 8/2005 | Kramer | |
| 2008/0257418 A1 | | 10/2008 | Kranz et al. | |
| 2009/0261281 A1 | * | 10/2009 | Mevius | ................. F16K 31/165 251/118 |
| 2011/0174381 A1 | * | 7/2011 | Foust | .................... G05D 16/02 137/1 |
| 2014/0083530 A1 | | 3/2014 | Fan | |
| 2014/0090726 A1 | | 4/2014 | Hawkins et al. | |
| 2014/0090727 A1 | | 4/2014 | Nguyen et al. | |
| 2016/0116920 A1 | * | 4/2016 | Hawkins | ............ G05D 16/0694 137/505.12 |

OTHER PUBLICATIONS

Written Opinion for Application No. PCT/US2015/034357 dated Jun. 17, 2016.
Invitation to pay additional fees/Annex to Form PCT/ISA/206—Communication relating to the results of the partial international search from International Application No. PCT/US2015/034357 dated Sep. 11, 2015.
Office Action for EP 15 729 717.7 dated Nov. 9, 2017.

* cited by examiner

FLUID REGULATOR HAVING A BIASED PRESSURE SENSE TUBE

FIELD OF THE INVENTION

The present invention relates generally to regulators such as fluid or gas regulators and, more specifically, to a regulator having a biased pressure sense tube.

BACKGROUND

Regulators are commonly employed in fluid or gas distribution systems to control the pressure in the system downstream of the regulator. As is known, the pressure at which a typical gas distribution system supplies gas may vary according to the demands placed on the system, the climate, the source of the supply, and/or other factors. However, most end-user facilities equipped with gas appliances such as, for example, furnaces, and ovens, require the gas to be delivered in accordance with predetermined pressure parameters. Therefore, such distribution systems use gas regulators to ensure that the delivered gas meets the requirements of the end-user facilities.

Conventional gas regulators generally include a closed-loop control actuator or control assembly for sensing and controlling the pressure of the delivered gas. Many regulators use a pneumatic control assembly having a diaphragm and a sense tube, such as a Pitot tube, that extends into the outlet side of the regulator. The tube senses, for example, the pressure or other parameters in the downstream or outlet end of the regulator, and communicates that sensed parameter to the control assembly. Based on the sensed parameter, the control assembly makes any needed adjustments to the position of a control element, which then keeps the sensed parameter at a desired value or within an acceptable range.

FIG. 1 depicts an example of a conventional regulator device 100. The regulator device 100 generally includes an actuator 104 coupled to a valve body 108. The valve body 108 includes an inlet 112, an outlet 116, and a valve port 120 disposed between the inlet 112 and the outlet 116. The regulator 100 further includes a balanced port control assembly 122 that is mounted within the valve body 108 and that aims to improve the reaction of the regulator 100 to variations in the downstream pressure. The balanced port control assembly 122 includes, in relevant part, a control element 124 that is movable relative to the valve port 120.

The actuator 104 is coupled to the valve body 108 to ensure that the pressure at the outlet 116 of the valve 108, i.e., the outlet pressure, is in accordance with a desired outlet or control pressure. The actuator 104 is a diaphragm-based actuator and includes an actuator housing 128 containing a control assembly 132 for regulating the outlet pressure of the valve body 108 based on sensed outlet pressure. The control assembly 132 generally includes a diaphragm 136, a piston 140, and a control arm 144 operatively connected to a valve stem 148. The valve stem 148 is connected to the movable control element 124 of the balanced port control assembly 122, such that movement of the actuator 104 moves the control element 124 relative to the valve port 120. The control assembly 132 also includes a diaphragm chamber 152, which is in fluid communication with the outlet 116 via a sense tube 156. The sense tube 156 generally has a mounting end 157 in fluid communication with the diaphragm chamber 152, and a flared and open sensing end 158 disposed opposite the first end 157 and configured to sense the pressure at or in the outlet 116. The control assembly 132 further includes a control spring 160 in engagement with a top side of the control assembly 132 to offset the outlet pressure sensed by the diaphragm 136. Accordingly, the desired outlet pressure, which may also be referred to as the control pressure, is set by the selection of the control spring 160.

Generally speaking, the inlet 112 of the regulator device 100 receives gas from a gas distribution system, for example, and the outlet 116 delivers gas to an end-user facility such as a factory, a restaurant, an apartment building, etc. having one or more appliances. The actuator 104, via the control assembly 132, controls the position of the control element 124, and, consequently, gas flowing through the regulator device 100 flows into the inlet 112, through the valve port 120, and out the outlet 116 to the end-user facility, with the position of the control element 124 controlling the flow of gas through the device 100.

The control assembly 132 regulates the outlet pressure of the body 108 of the regulator device 100 based on the outlet pressure sensed in or at the outlet 116. More specifically, the diaphragm 136 senses the outlet pressure of the valve 108 and provides a response to move the valve stem 148 to open and close the valve 108. Specifically, the control assembly 132 includes a diaphragm support plate 164 coupled to the piston 140, which together move the position of the diaphragm 136, the control arm 144, the valve stem 148, and ultimately the control element 124. The open, sensing end 158 of the sense tube 156 senses the pressure in or at the outlet 116. If the sensed pressure is too low, the pressure in the diaphragm chamber 152 drops accordingly, by virtue of the flow communication provided by the mounting end 157 of the sense tube 156. Consequently, because the desired control pressure is applied to the piston side of the actuator 104, the pressure differential will cause the diaphragm 136 to move (to the right when viewing FIG. 1), which in turn moves the control element 124 (upward when viewing FIG. 1). This opens the valve port 120 more, thus increasing the pressure in the outlet 116. On the other hand, if the sensed pressure is too high, the pressure in the diaphragm chamber 152 is greater than the desired control pressure, and the pressure differential against the diaphragm 136 causes the diaphragm 136 to move (to the left when viewing FIG. 1), thus moving the control element 132 closer to the valve seat, which decreases the flow through the valve port 120.

As noted above, the sense tube 156 has a mounting end 157 and a flared and open sensing end 158. When fluid flows from the inlet 112, through the valve port 120, and out the outlet 116 over and past the sense tube 156, the sense tube 156 senses the pressure of the fluid at the flared and open sensing end 158. In high flow situations, however, there tends to be a large pressure drop across the flared and open sensing end 158, such that the sense tube 156 detects an artificially low pressure at the flared and open sensing end 158. In other words, the sense tube 156 senses a pressure that is lower than the actual pressure at the outlet 116. When the sense tube 156 communicates this artificially low pressure, via the mounting end 157, to the diaphragm chamber 152, this causes the diaphragm 136 to move (to the right when viewing FIG. 1) more than necessary or required, which in turn moves the control element 124 (upward when viewing FIG. 1) more than necessary and opens the valve port 120 more than necessary. Accordingly, the sense tube 156 may boost the downstream outlet pressure out of accuracy, thereby limiting the capacity of the regulator 100.

SUMMARY

In accordance with a first exemplary aspect of the invention, a fluid regulating device includes a valve body, a control element, a control assembly, and a sense tube. The valve body has an inlet, an outlet, a valve port, and a control element adapted to be displaced relative to the valve port to control the flow of a fluid between the inlet and the outlet. The control assembly is operatively coupled to the control element and includes a diaphragm disposed adjacent a diaphragm chamber. The sense tube has a first end, a second end, and a sense hole. The first end is positioned to communicate with the diaphragm chamber, the second end is disposed adjacent the outlet, and the sense hole being formed in the sense tube between the first end and the second end and extending along an axis that is angled relative to an axis of the outlet.

In accordance with a second exemplary aspect of the invention, a fluid regulating device includes a valve body, a control element, a control assembly, and a sense tube. The valve body has an inlet, an outlet, a valve port, and a control element adapted to be displaced relative to the valve port to control the flow of a fluid between the inlet and the outlet. The control assembly is operatively coupled to the control element and includes a diaphragm disposed adjacent a diaphragm chamber. The sense tube has a mounting portion and a sensing portion, the mounting portion positioned to communicate with the diaphragm chamber, and the sensing portion disposed proximate to the outlet and extending along a central longitudinal axis. The sense tube further includes a sense hole formed in the sensing portion of the sense tube. The sense hole extends along an axis that is angled relative to the central longitudinal axis.

In accordance with a third exemplary aspect of the invention, a sense tube is provided for sensing output pressure for a fluid regulating device that includes a valve body, a control element shiftably disposed within the valve body, and a control assembly operatively coupled to the control element, the valve body having an inlet, an outlet, and a valve port, the control element adapted to be displaced relative to the valve port to control the flow of a fluid between the inlet and the outlet, and the control assembly including a diaphragm disposed adjacent a diaphragm chamber. The sense tube includes a mounting portion and a sensing portion, the mounting portion adapted to be positioned within the valve body to provide flow communication with the diaphragm chamber of the control assembly, and the sensing portion adapted to be disposed proximate to the outlet of the valve body, the sensing portion having a central longitudinal axis and a second end, the second end being closed. The sense tube further includes a sense hole formed in the sensing portion of the sense tube, the sense hole extending along an axis that is angled relative to the central longitudinal axis.

In further accordance with any one or more of the foregoing first, second, or third exemplary aspects, a fluid regulating device and/or sense tube may include any one or more of the following further preferred forms.

In one preferred form, the second end of the sense tube can be closed.

In another preferred form, the sense hole can be formed proximate or immediately adjacent to the closed second end.

In another preferred form, the sense hole can be oriented along an axis that is at least substantially perpendicular to the flow of fluid at the outlet.

In another preferred form, the sense tube can have a flared portion disposed adjacent to the second end. The sense hole can be spaced away from and upstream of the flared portion.

In another preferred form, the sense tube can be a cylindrical tube having a top semi-cylindrical portion and a bottom semi-cylindrical portion. The sense hole can be formed in the top or bottom semi-cylindrical portion of the cylindrical tube.

In another preferred form, the sense hole can have a diameter in a range of between 50% to 150% the size of an internal diameter of the sense tube.

In another preferred form, a balanced port assembly can be disposed within the valve body.

DETAILED DESCRIPTION OF THE PREFERRED EMBODIMENTS

The present disclosure is directed to a sense tube for a fluid regulating device. The sense tube disclosed herein includes a sense hole, for sensing outlet pressure, that is formed in the tube at an angle (e.g., 90 degrees) relative to an outlet axis and, thus, the flow of fluid. In doing so, the sense tube picks up the static pressure signal instead of the velocity pressure signal, thereby reducing, if not removing the velocity component of pressure. The sense tube also includes a closed end (which is open in conventional sense tubes), thereby reducing, if not eliminating, the large pressure drop typically seen in conventional sense tubes. The sense tube disclosed herein thus provides for a more accurate outlet pressure signal, which, in turn, improves the accuracy and maximum performance of the fluid regulating device.

Figure 1:
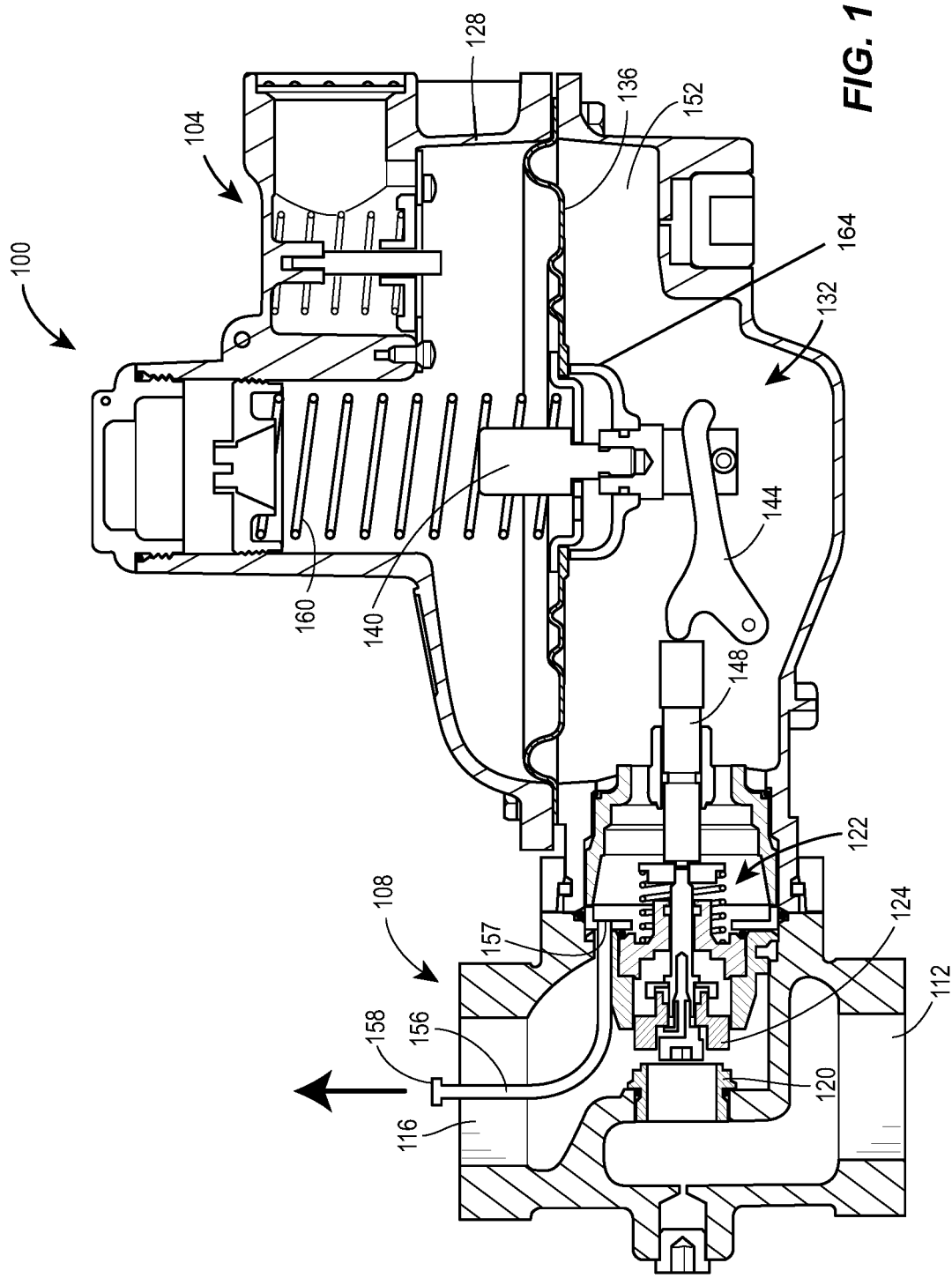
FIG. 1 is a cross-sectional view of a conventional fluid regulating device having a sense tube extending between a diaphragm chamber of a control assembly and an outlet of the device.
Figures 2A, 2B:
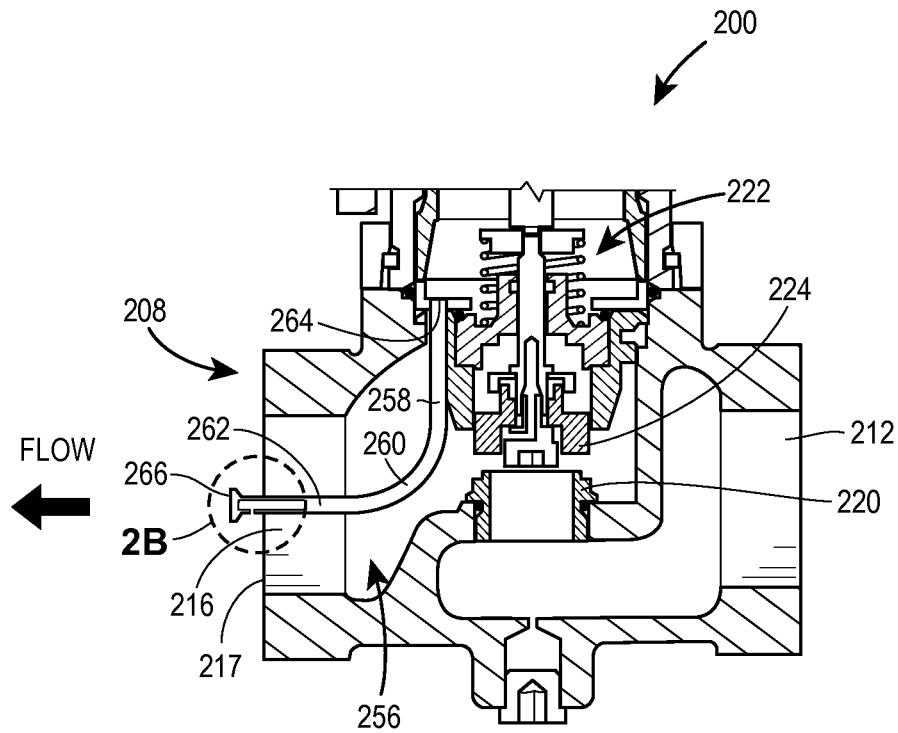
FIG. 2A is an enlarged fragmentary cross-sectional view of a fluid regulating device having a sense tube assembled in accordance with the teachings of a first disclosed example of the present invention.
FIG. 2B is an enlarged fragmentary cross-sectional view of a downstream end of the sense tube illustrated in FIG. 2A.

FIG. 2A illustrates an example of a portion of fluid regulating device 200 constructed and assembled in accordance with the teachings of a first disclosed example of the present invention. The portion of the fluid regulating device 200 illustrated in FIG. 2 includes a valve body 208. The valve body 208 includes an inlet 212, an outlet 216, and a valve port 220 disposed between the inlet 212 and the outlet 216. The regulator 200 further includes a balanced port control assembly 222 that is mounted within the valve body 208 and aims to improve the reaction of the regulator 200 to variations in the downstream pressure. The balanced port control assembly 222 includes, in relevant part, a control element 224 that is shiftably disposed within the valve body 208, such that the control element 224 can be displaced relative to the valve port 220 in order to control the flow of the fluid between the inlet 212 and the outlet 216. The control element 224 is connected to the control assembly 132, which is described above in connection with FIG. 1 and which controls the position of the control element 224, though any other suitable control assembly may instead be used. Consequently, the control assembly employed in the fluid regulating device 200 will include the same or similar components described above in connection with FIG. 1, such as the diaphragm 136, the piston 140, the control arm 144, the valve stem 148, the diaphragm chamber 152, and the control spring 160.

Instead of the sense tube 156, which, as outlined above, tends to sense artificially low outlet pressures (e.g., a pressure that is lower than the pressure at the outlet 216), the fluid regulating device 200 includes a sense tube 256 configured to more accurately sense the pressure at the outlet 216. Accordingly, the sense tube 256 optimizes the transmission of the pressure signal from the pipeline to the diaphragm 136.

With reference to FIG. 2A, the sense tube 256 generally includes a cylindrical tube that has a mounting portion 258, a bent or intermediate portion 260, and a sensing portion 262. The mounting portion 258 terminates at a mounting end 264 positioned within the valve body 208 to provide flow communication with the diaphragm chamber 152 of the control assembly 132. The sensing portion 262 is generally positioned to sense the outlet pressure at the outlet 216. As illustrated in FIGS. 2A and 2B, the sensing portion 262 extends along a central longitudinal axis 265 that is parallel to (e.g., co-axial with) an axis 267 of the outlet 216 and, thus, the flow of fluid through or at the outlet 216. The sensing portion 262 extends out of the valve body 208 and extends into or within a downstream pipe (not shown) coupled to the valve body 208 at the outlet 216. The sensing portion 262 terminates at an end 266 that is positioned within this downstream pipe but adjacent a distal portion 217 of the outlet 216. The intermediate portion 260 is disposed between the mounting portion 258 and the sensing portion 262 within the valve body 208. So positioned, the intermediate portion 260 is disposed downstream of the mounting end 264 but upstream of the end 266.

As best illustrated in FIG. 2B, the sensing tube 256 is flared or has a flared portion 268 disposed immediately adjacent the end 266 of the sensing portion 262, much like the sense tube 156 described above. However, unlike the sense tube 156, wherein the flared sensing end 158 is open, and which senses the outlet pressure at this flared and open sensing end 158, the end 266 of the sense tube 256 is closed. Thus, the sense tube 256 does not sense the outlet pressure via the end 266, thereby eliminating the large pressure drop seen in the sense tube 156 and other conventional sense tubes. Instead, for this purpose, the sense tube 256 includes a sense or sensing hole 270 that is formed in or along the sensing portion 262 of the sense tube 256 and is oriented and extends in a direction that is normal to the direction of fluid flow, thereby reducing, if not completely removing, the velocity component of pressure (the static component is instead picked up). The location of the sense hole 270 is generally biased to be in the semi-cylindrical portion, quadrant, or other portion of the downstream pipe with the greatest concentration of total static pressure (e.g., the portion corresponding to high flow), though this need not always be the case. Beneficially, by sensing outlet pressure using the sense hole 270, the sense tube 256 can be shorter in the turbulent portion of the body 208.

As illustrated in FIG. 2B, the sensing hole 270 in the depicted example is formed in a tubular wall 274 of the sensing portion 262 of the sense tube 256 at a position that is immediately adjacent or proximate to, but spatially separated from, the flared but closed end 266 of the sense tube 256. The diameter $D_{hole}$ of the sensing hole 270 will generally vary according to the overall size of the regulating device 200, e.g., according to the internal diameter $D_{tube}$ of the sense tube 256. In some embodiments, the diameter $D_{hole}$ of the sensing hole 270 can be in a range of between 50% to 150% the size of the internal diameter $D_{tube}$ of f the sense tube 256. In the depicted example, the sensing hole 270 is a 1.2 mm diameter circular hole that is formed in a lower semi-cylindrical portion of the tubular wall 274, the lower semi-cylindrical portion being defined as or corresponding to the portion of the tubular wall 274 located below a plane in which the central longitudinal axis 265 lies (when viewed from FIG. 2B). As illustrated in FIGS. 2A and 2B, the sensing hole 270 is oriented and extends along an axis 278 that is perpendicular to both the central longitudinal axis 265 and the axis 267 of the outlet (and thus the flow of fluid at or through the outlet 216).

It will be appreciated that the sense tube 256 illustrated herein can vary and yet still fall within the principles of the present invention. While the sense tube 256 is illustrated as being a cylindrical sense tube, the present invention is not limited to cylindrical sense tubes. Instead, the sense tube 256 can have, for example, a generally rectangular, triangular, square, irregular, or other cross-section. The length of the sense tube 256, particularly the mounting portion 258 and/or the sensing portion 262, can vary. For example, the sensing portion 262 can be shorter (e.g., such that it does not extend outside of the valve body 208) or longer (e.g., such that it extends further into the downstream piping). The position of the sensing portion 262, particularly the end 266 of the sensing portion 262, can also vary and still fall within the principles of the present invention. The sensing portion 262 can, for example, be positioned such that the end 266 extends further outside of the valve body 208 (and thus further away from the distal portion 217) or such that the end 266 is positioned within the valve body 208. Alternatively or additionally, the sensing portion 262, or portions thereof, can be angled relative to the axis 265.

Figure 3:
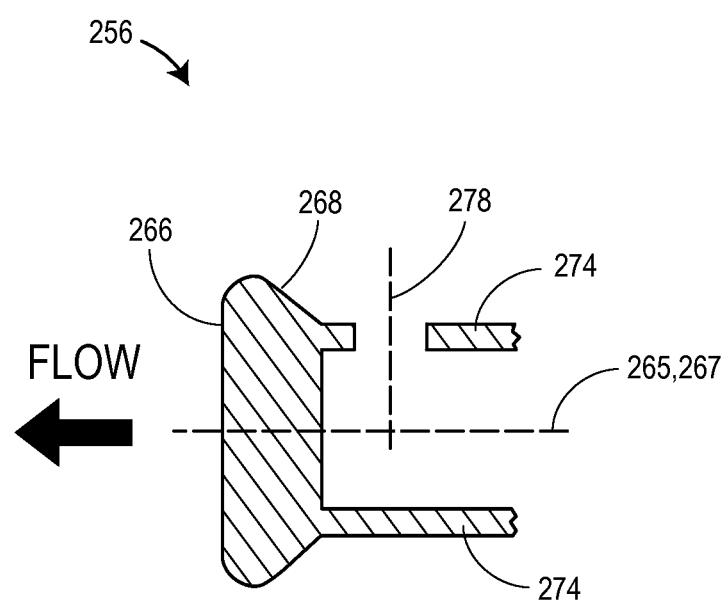
FIG. 3 is an enlarged fragmentary cross-sectional view of a downstream end of a sense tube that is assembled in accordance with the teachings of a second disclosed example of the present invention and can be utilized in the fluid regulating device shown in FIG. 2A.

Moreover, the sensing hole 270 can vary and yet still sense the outlet pressure in the intended manner. In some examples, the sensing hole 270 can be formed in a different position in or along the sensing portion 256 of the sense tube 256. The sensing hole 270 can, for example, be formed at a position that is closer to or further from the flared portion 268. The sensing hole 270 can, as another example, be formed such that it extends at a different angle (e.g., 45 degrees, substantially perpendicular) relative to the axis 267 of the outlet 216 and/or the central longitudinal axis 265. In other words, the sensing hole 270 need not be oriented perpendicular to the fluid flow and/or the axis 265. While the sensing hole 270 is illustrated in FIG. 2B as being formed in the lower quadrant of the tubular wall 274, the sensing hole 270 can be formed in a different portion of the tubular wall 274 of the sense tube 256. As illustrated in FIG. 3, the sensing hole 270 can, for example, be formed in an upper semi-cylindrical portion of the tubular wall 274 (the upper semi-cylindrical portion being defined as or corresponding to the portion of the tubular wall 274 above the plane in which the central longitudinal axis 265 lies). In other examples, particularly when the sense tube 256 has a differently shaped cross-section (i.e., the sense tube 256 is not a cylindrical sense tube), the sensing hole 270 can be formed in any number of different portions of the sense tube 256. Furthermore, the sensing hole 270 can vary in shape and/or size. The sensing hole 270 can, for example, have a rectangular, triangular, irregular, or other shape in cross-section. Likewise, the sensing hole 270 can have a diameter or size that is larger or smaller than the sensing hole 270 illustrated in FIG. 2B (which has a diameter of approximately 1.2 mm). For example, the sensing hole 270 can have a diameter of less than 1 mm or greater than 2 mm. Finally, it will be appreciated that the more than one sensing hole 270 can be formed in the sensing portion 262 of the sense tube 256. For example, the sense tube 256 can include two sensing holes 270 formed at or in different portions of the sensing portion 262.

Based on the foregoing description, it should be appreciated that the devices, systems, and methods described herein more accurately sense the outlet pressure in a fluid regulating device and, in turn, provide a more accurate pressure signal to the diaphragm in the fluid regulating device. Accordingly, the accuracy and the maximum performance of the fluid regulating device can be improved. Gas utilities, which bill customers for gas consumption based on an assumed outlet pressure setting, will find these improvements particularly advantageous. With more accurate flow rates possible, gas utilities may, for example, use the fluid regulating device disclosed herein across a larger range of applications that require a minimum amount of gas delivery under all loads.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. A fluid regulating device, comprising:
   a valve body having an inlet, an outlet, and a valve port;
   a control element shiftably disposed within the valve body, the control element adapted to be displaced relative to the valve port to control the flow of a fluid between the inlet and the outlet;
   an actuator comprising an actuator housing and a control assembly arranged in the actuator housing, the actuator housing coupled to the valve body, and the control assembly operatively coupled to the control element, the control assembly including a diaphragm disposed adjacent a diaphragm chamber of the actuator housing; and
   a sense tube having a first end, a second end, and a sense hole, the first end being positioned within the valve body to provide flow communication with the diaphragm chamber, the second end being disposed adjacent a distal portion of the outlet, and the sense hole being formed in the sense tube between the first end and the second end, the sense hole extending along an axis that is angled relative to an axis of the outlet,
   wherein the second end is closed, and
   wherein the sense tube has a flared portion disposed adjacent to the second end, the sense hole being spaced away from and upstream of the flared portion.

2. The fluid regulating device of claim 1, wherein the sense hole is formed proximate to the closed second end.

3. The fluid regulating device of claim 1, wherein the sense hole is oriented along an axis that is perpendicular to the axis of the outlet.

4. The fluid regulating device of claim 1, wherein the sense tube comprises a cylindrical tube having a top semi-cylindrical portion and a bottom semi-cylindrical portion, the sense hole being formed in the top or bottom semi-cylindrical portion of the cylindrical tube.

5. The fluid regulating device of claim 4, wherein the sense hole is formed in the bottom semi-cylindrical portion of the cylindrical tube.

6. The fluid regulating device of claim 1, wherein the sense tube has an internal diameter and the sense hole has a diameter in a range of between 50% to 150% the size of the internal diameter of the sense tube.

7. A fluid regulating device, comprising:
   a valve body having an inlet, an outlet, and a valve port;
   a control element shiftably disposed within the valve body, the control element adapted to be displaced relative to the valve port to control the flow of a fluid between the inlet and the outlet;
   an actuator comprising an actuator housing and a control assembly arranged in the actuator housing, the actuator housing coupled to the valve body, and the control assembly operatively coupled to the control element, the control assembly including a diaphragm disposed adjacent a diaphragm chamber of the actuator housing;
   a sense tube having a mounting portion and a sensing portion, the mounting portion being positioned within the valve body to provide flow communication with the diaphragm chamber, and the sensing portion disposed proximate to the outlet and extending along a central longitudinal axis; and
   a sense hole formed in the sensing portion and extending along an axis that is angled relative to the central longitudinal axis,
   wherein the sensing portion terminates at an end proximate to a distal portion of the outlet, the end being closed, and
   wherein the sensing portion has a flared portion disposed adjacent to the closed end, the sense hole being spaced away from and upstream of the flared portion.

8. The fluid regulating device of claim 7, wherein the sense hole is formed immediately adjacent the closed end.

9. The fluid regulating device of claim 7, wherein the sense hole extends along an axis that is perpendicular to the central longitudinal axis.

10. The fluid regulating device of claim 7, wherein the sense tube comprises a cylindrical tube having a top semi-cylindrical portion and a bottom semi-cylindrical portion, the sense hole being formed in the top or bottom semi-cylindrical portion of the cylindrical tube.

11. The fluid regulating device of claim 10, wherein the sense hole is formed in the bottom semi-cylindrical portion of the cylindrical tube.

12. The fluid regulating device of claim 7, further comprising a balanced port control assembly disposed within the valve body.

13. A sense tube for sensing output pressure for a fluid regulating device, the fluid regulating device comprising a valve body, a control element shiftably disposed within the valve body, and an actuator comprising an actuator housing coupled to the valve body and a control assembly arranged in the actuator housing and operatively coupled to the control element, the valve body having an inlet, an outlet, and a valve port, the control element adapted to be displaced relative to the valve port to control the flow of a fluid between the inlet and the outlet, the control assembly including a diaphragm disposed adjacent a diaphragm chamber of the actuator housing, the sense tube comprising: a mounting portion adapted to be positioned within the valve body to provide flow communication with the diaphragm chamber of the control assembly; a sensing portion adapted to be disposed proximate to the outlet of the valve body, the sensing portion having a central longitudinal axis and an end, the end being closed; a sense hole formed in the sensing portion of the sense tube, the sense hole extending along an axis that is angled relative to the central longitudinal axis; and a flared portion disposed adjacent to the second end, the sense hole being spaced away from and upstream of the flared portion.

14. The sense tube of claim 13, wherein the sense hole extends along an axis that is perpendicular to the central longitudinal axis.

15. The sense tube of claim 13, wherein the sense hole is formed immediately adjacent the end of the sensing portion.

16. The sense tube of claim 13, wherein the sense tube comprises a cylindrical tube having a top semi-cylindrical portion and a bottom semi-cylindrical portion, the sense hole being formed in the top or bottom semi-cylindrical portion of the cylindrical tube.

17. A fluid regulating device, comprising:
a valve body having an inlet, an outlet, and a valve port;
a control element shiftably disposed within the valve body, the control element adapted to be displaced relative to the valve port to control the flow of a fluid between the inlet and the outlet;
an actuator comprising an actuator housing and a control assembly arranged in the actuator housing, the actuator housing coupled to the valve body, and the control assembly operatively coupled to the control element, the control assembly including a diaphragm disposed adjacent a diaphragm chamber of the actuator housing; and
a sense tube having a first end, a second end, and a sense hole, the first end being positioned within the valve body to provide flow communication with the diaphragm chamber, the second end being disposed adjacent a distal portion of the outlet, and the sense hole being formed in the sense tube between the first end and the second end, the sense hole extending along an axis that is angled relative to an axis of the outlet,
wherein the second end is closed, and
wherein the second end is disposed outside of the valve body.

18. The fluid regulating device of claim 17, wherein the sense hole is formed proximate to the closed second end.

19. The fluid regulating device of claim 17, wherein the sense hole is oriented along an axis that is perpendicular to the axis of the outlet.

20. The fluid regulating device of claim 17, wherein the sense tube comprises a cylindrical tube having a top semi-cylindrical portion and a bottom semi-cylindrical portion, the sense hole being formed in the top or bottom semi-cylindrical portion of the cylindrical tube.

* * * * *

UNITED STATES PATENT AND TRADEMARK OFFICE
CERTIFICATE OF CORRECTION

PATENT NO.       : 10,001,785 B2
APPLICATION NO.  : 14/712631
DATED            : June 19, 2018
INVENTOR(S)      : Jeffrey Michael Sanders et al.

It is certified that error appears in the above-identified patent and that said Letters Patent is hereby corrected as shown below:

In the Specification

At Column 6, Line 2, "of f the" should be -- of the --.

Signed and Sealed this
Fifth Day of May, 2020

Andrei Iancu
*Director of the United States Patent and Trademark Office*